US007758316B2

(12) United States Patent
Bonne et al.

(10) Patent No.: US 7,758,316 B2
(45) Date of Patent: Jul. 20, 2010

(54) ION MICRO PUMP

(75) Inventors: Ulrich Bonne, Hopkins, MN (US); Paul Bauhahn, Fridley, MN (US)

(73) Assignee: Honeywell International Inc., Morristown, NJ (US)

( * ) Notice: Subject to any disclaimer, the term of this patent is extended or adjusted under 35 U.S.C. 154(b) by 1051 days.

(21) Appl. No.: 11/394,131

(22) Filed: Mar. 30, 2006

(65) Prior Publication Data

US 2007/0235643 A1 Oct. 11, 2007

(51) Int. Cl.
*F04F 99/00* (2009.01)
*B01D 59/44* (2006.01)
*B03C 3/00* (2006.01)

(52) U.S. Cl. .............................. 417/48; 417/53; 95/79; 96/77; 250/283

(58) Field of Classification Search .................. 417/48, 417/50, 53; 95/78, 79; 96/63, 73, 77; 250/281, 250/283, 292, 293
See application file for complete search history.

(56) References Cited

U.S. PATENT DOCUMENTS 4,380,720 A * 4/1983 Fleck .................... 315/111.91
5,136,161 A * 8/1992 Logan ........................ 250/293
6,806,463 B2 10/2004 Miller et al. ................ 250/286
6,815,668 B2 11/2004 Miller et al. ................ 250/286
7,004,238 B2 * 2/2006 Seyed-Yagoobi et al. ..... 165/96
7,547,879 B2 * 6/2009 Miller et al. ................ 250/286
2005/0141999 A1 6/2005 Bonne ......................... 417/48

OTHER PUBLICATIONS

Suresh Garimella and Timothy Fisher (Purdue University), "Create Cooling Current with Nano-Lighting", Micro Nano Newsletter, 9#4, p. 5 (Apr. 2005).
U. Bonne, "Evaluation of Ion-Drag and Fluidic Diode Pumping", Chapter 7 in "Micro GC Trade-Off Study, Final Report to DARPA" HL-Plymouth, Nov. 19, 2003.
G.A. Eiceman, *E.V.Drylov, and N.S. Krylova (NMSV), E.G. Nazarov and R.A. Miller (Sionex, Inc., Waltham, MA), "Separation of Ions from Explosives in Differential Mobility Spectrometry by Vapor—Modified Drift Gas", Anal. Chem. 2004, 76, 4937-4944.
U. Bonne, G. Eden, G. Frye-Mason, C. Herring, R. Sacks and R. Synovec, "Micro Gas Chromatography Tradeoff Study, Final Report", to DARPA/AFRC/UTC, Contract No. 03-S530-0013-01-C1, Plymouth, MN, Dec. 1, 2003.
J.B. Calvert, "Polarization", The influence of matter on the electric field, <Physics Index>, Created: Sep. 27, 2002, Last Rev. Oct. 12, 2002, 6 pgs.
Thomas M. Christensen, "Physics of Thin Films", 'Kinetic Theory of Gasses', Lectures Spring 2000, University of Colorado, Dept. of Physics and Energy Science, Colorado Springs, 8 pages.

(Continued)

*Primary Examiner*—Charles G Freay
(74) *Attorney, Agent, or Firm*—Husch Blackwell Sanders Welsh & Katz

(57) ABSTRACT

A method and apparatus are provided for pumping a gas. The method includes the steps of ionizing the gas, separating the ionized gas into groups of positive and negative ions using positive and negative electric fields and separately pulling the groups of positive and negative ions along a channel using the negative and positive electric fields.

21 Claims, 1 Drawing Sheet

OTHER PUBLICATIONS

Applied Nanotech, Inc. "Basic Properties of Carbon Nanotubes", Copyright 2002-2005 Applied Nanotechnologies, Inc., 7 pages.

Oxford Instruments X-ray Technologies, Inc., "Portable X-Ray Sources", Copyright 2005, Last Rev. Apr. 4, 2005, 2 pages.

Dr. William B. Whitten et al., "Micro Ion Trap Mass Spectrometer", MGA Project funded by DARPA-MTO, 2 pages. www.darpa.mil/mto/mga/summaries/2004_summaries/oakridge.html.

* cited by examiner

ION MICRO PUMP

STATEMENT REGARDING FEDERALLY-SPONSORED RESEARCH OR DEVELOPMENT

This invention was made with Government support under Contract No. FA8650-04-C-2502 awarded by AFRL Wight Lab. The Government has certain rights in this invention.

FIELD OF THE INVENTION

The field of the invention relates to microanalytics and more particularly to gas pumps.

BACKGROUND OF THE INVENTION

Presently available gas pumps for microanalytics are relatively large and use mechanical actuators that are subject to wear and limited service life. The use of mechanical actuators creates undesirable flow pulsations that can only be reduced through bulky buffer volumes. The difficulty of fabricating and assembling such mechanical pumps is significant and contributes to their high price.

Ion drag pumps overcome many of the deficiencies of mechanical pumps. Ion drag pumps first ionize a gas and then use an electric field to attract the ions. As ions are pulled along by the electric field, they also drag along other neutral gas molecules.

As the ions progress away from the point of ionization, the ions tend to recombine. However, by that time other ions have been created at the point of ionization that continue to push the recombined ions along, thereby continuing the flow of gas.

While ion drag pumps are an improvement over mechanical pumps, they are still relatively inefficient because of the rapid rate of recombination. Accordingly, a need exists for improved pumping methods for microanalytic devices.

SUMMARY

A method and apparatus are provided for pumping a gas. The method includes the steps of ionizing the gas, separating the ionized gas into groups of positive and negative ions using positive and negative electric fields and separately pulling the groups of positive and negative ions along a channel using the negative and positive electric fields.

DETAILED DESCRIPTION OF AN ILLUSTRATED EMBODIMENT

Figure 1:
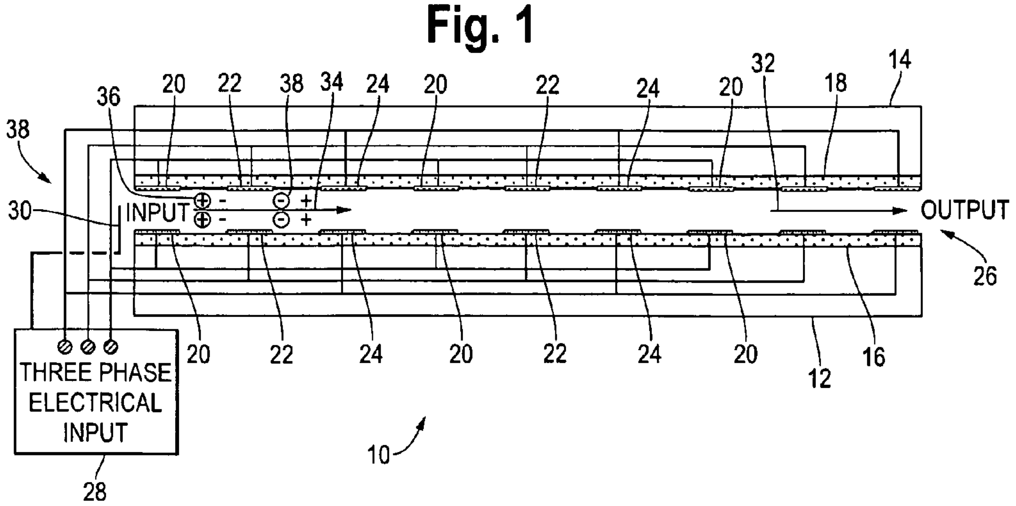
FIG. 1 depicts an electronic pump in accordance with an illustrated embodiment of the invention.

FIG. 1 depicts a pump 10 shown generally in accordance with an illustrated embodiment of the invention. The pump 10 eliminates the shortcomings of prior art pumps by generating a steady gas flow via ion-drag, but by minimizing ion-loss due to recombination. The pump 10 reduces loss due to recombination by trapping both positive and negative charge carriers (in separate traps) and moving them in a traveling quadrupole e-field, as indicated in FIG. 1, and while maintaining electroneutrality by transporting both the positive and negative ions.

In general, pumping within the pump 10 occurs within a pumping channel 26 of appropriate length (e.g., 1-10 cm) and diameter (e.g., 10-100 microns) bounded by a semiconductor substrate (e.g., silicon) 12, 14. The semiconductor substrates 12, 14 may have insulating layers 16, 18 that separate the channel 26 from the semiconductor substrate 12, 14.

Disposed on the insulating layers 16, 18 within the channel 26 is a repeating set of electrodes 20, 22, 24 at an appropriate width (in the direction of flow 32) and inter-electrode spacing (e.g., 1-20 microns). The electrodes extend across diameter of the channel 26 perpendicular to a direction 32 of gas flow within the pump 10.

The electrodes 20, 22, 24 may supply an appropriate electrical gradient (e.g., 10 kV/cm) along the channel 26 from an n-phase power supply 28 operating at an appropriate frequency (e.g., less than 20 kHz). The connection of the n-phase power supply 28 to the repeating set of electrodes creates a traveling quadrupole electric field 34 within the channel 26.

In general, gas enters the pump 10 through an entry aperture 38 and drifts past an ionizer (e.g., an ionizing device) 30. The ionizer 30 may be any of a number of different devices (e.g., a corona discharge electrode, ionizing radiation source, etc.). Where the ionizing device 30 is an electrode, the device 30 may receive its ionizing voltage from the power supply 28.

As the gas drifts past the ionizing device, the gas becomes ionized into positive and negative ions 36, 38. Since the positive and negative ions 36, 38 are proximate the traveling electric field 34, the positive ions 36 are attracted and drawn into a positive ion trap formed by a negative electrode 20, 22, 24 of the traveling electric field 34 and the negative ions 38 are drawn towards and into a negative ion trap formed by a positive electrodes 20, 22, 24 of the electric field 34.

Since the electric field 34 is moving along the channel 26, the ions 36, 38 are drawn along with the electric field 34 in the direction of flow 32. Since the positive and negative electrodes of the traveling electric field are spatially separated, the positive ions 36 and negative ions 38 also remain separated as they are being pulled along by the traveling electric field 34. Since the positive ions 36 and negative ions 38 are kept separated, there is no recombination of ions 36, 38 as the ionized gas flows along the channel 26. Also, since the ions 36, 38 are all urged along in a single direction, the cumulative effect of the attractive forces on the ions 36, 38 by the succession of electrodes 20, 22, 24 causes compression of the gas along a length of the channel 26.

In another illustrated embodiment, the pump 10 may be combined with other pumps 10 in a series/parallel relationship to form a pump assembly 100 (FIG. 2) that incorporates the concepts of the pump 10. The series/parallel relationship of the pump 100 may be used to increase a volume and/or pressure of a pumped gas.

Figure 2:
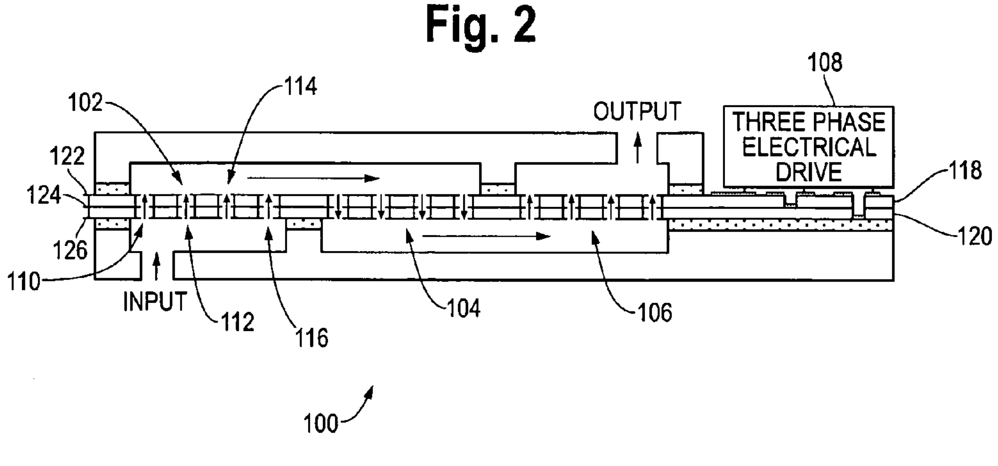
FIG. 2 depicts the electronic pump of FIG. 1 under an alternate embodiment.

For example and as shown in FIG. 2, a first set of pumps 10 (now labeled “110”, “112”, “114”, “116”) may be arranged into parallel pumping assembly 102 that has four times the volume of the pump 10 of FIG. 1. In addition, the pump assemblies 102, 104, 106 may be arranged in series to multiply the pressure.

As shown in FIG. 2, the pump 100 may be formed from two or more layers 118, 120 of a semiconductor (e.g., silicon) sandwiched between metallic films 122, 124, 126. The pumps 110, 112, 114, 116 may be formed within the sandwich by providing through-holes (apertures) through the sandwich. The traveling electric field may be provided by connecting the phases of an n-phase electric source 108 to the respective films 122, 124, 126.

In still further alternate embodiments, the pump 10 may be used as a valve. In this case, the number of electrodes 20, 22,

24 is chosen to oppose and balance an external pressure (e.g., to facilitate valve-less injection of a preconcentrated analyte from a sample gas #1 such as air into a carrier gas stream #2, such as hydrogen.

The pumps 10, 100 eliminate flow pulsations and the need for buffer volumes. Since the pumps 10, 100 rely upon an electric field for pumping, there is no mechanical noise and no mechanical wear.

A specific embodiment of an electronic pump has been described for the purpose of illustrating the manner in which one possible alternative of the invention is made and used. It should be understood that the implementation of other variations and modifications of embodiments of the invention and its various aspects will be apparent to one skilled in the art, and that the various alternative embodiments of the invention are not limited by the specific embodiments described. Therefore, it is contemplated to cover all possible alternative embodiments of the invention and any and all modifications, variations, or equivalents that fall within the true spirit and scope of the basic underlying principles disclosed and claimed herein.

The invention claimed is:

1. A method of pumping a gas comprising:

ionizing the gas;

providing a channel having a plurality of spaced apart electrodes of a relatively constant length extending along the channel;

separating the ionized gas into groups of positive and negative ions using positive and negative electric fields applied to the plurality of electrodes along the length of a channel; and separately urging the groups along the channel while maintaining electro-neutrality by transporting both the positive and negative groups using the negative and positive electric fields alternatively applied to the plurality of electrodes.

2. The method of pumping a gas as in claim 1 further comprising disposing the plurality of electrodes along the channel transverse to a direction of travel of the groups of ions.

3. The method of pumping a gas as in claim 2 further comprising advancing the positive and negative electric fields from electrode to electrode of the plurality of electrodes along the direction of travel within the channel.

4. The method of pumping a gas as in claim 2 wherein the positive and negative electric fields further comprises a traveling quadrupole electric field that progresses along the direction of travel within the channel.

5. The method of pumping a gas as in claim 4 wherein the traveling electric field further comprises an n-phase electric field that progresses along the channel.

6. The method of pumping a gas as in claim 5 wherein the n-phase electric field further comprises an alternating field operating at a frequency of less than 20 kHz.

7. The method of pumping a gas as in claim 1 wherein the step of ionizing the gas further comprises using a corona discharge electrode.

8. The method of pumping a gas as in claim 1 wherein the channel further comprises a length of 1-10 cm.

9. The method of pumping a gas as in claim 1 wherein the channel further comprises a diameter of 3-100 microns

10. The method of pumping a gas as in claim 1 wherein the channel further comprises a voltage gradient along the channel of 10 kV/cm.

11. An apparatus for pumping a gas comprising:

a channel;

an ionizer disposed at an entrance to the channel that ionizes the gas;

a plurality of electrodes disposed along the channel transverse to a direction of flow within the channel the electrodes having a relatively constant length along the direction of flow; and a continuous positive and negative electric field along the length of the channel imposed on the plurality of electrodes that separates the ionized gas into groups of positive and negative ions and that separately pulls the groups of positive and negative ions along the channel using the negative and positive electric fields.

12. The apparatus for pumping a gas as in claim 11 wherein the positive and negative electric fields further comprises a traveling quadrupole electric field that progresses along the direction of travel within the channel.

13. The apparatus for pumping a gas as in claim 12 wherein the traveling electric field further comprises an n-phase electric field that progresses along the channel.

14. The apparatus for pumping a gas as in claim 13 wherein the n-phase electric field further comprises an alternating field operating at a frequency of less than 20 kHz.

15. The apparatus for pumping a gas as in claim 11 wherein the ionizer further comprises a corona discharge electrode.

16. The apparatus for pumping a gas as in claim 11 wherein the channel further comprises a length of 1-10 cm.

17. The apparatus for pumping a gas as in claim 11 wherein the channel further comprises a diameter of 3-100 microns.

18. The apparatus for pumping a gas as in claim 11 wherein the channel further comprises a voltage gradient along the channel of 10 kV/cm.

19. The apparatus for pumping a gas as in claim 11 wherein the electrodes disposed along the channel further comprise an electrode width and spacing of 1 to 20 microns.

20. An apparatus for pumping a gas comprising:

a plurality of channels arranged in series;

an ionizer disposed at an entrance to each of the channels that ionizes that gas;

a plurality of electrodes disposed along each of the channels transverse to a direction of flow within the channel where the plurality of electrodes have a relatively constant length along the direction of flow; and a continuous positive and negative electric field along the length of the channel imposed on the plurality of electrodes of each of the channels that separates the ionized gas into groups of positive and negative ions and that separately pulls the groups of positive and negative ions along the channels using the negative and positive electric fields.

21. The apparatus for pumping the gas as in claim 19 further comprising a plurality of channels arranged in parallel.

* * * * *